United States Patent

[11] 3,609,429

| [72] | Inventor | Harris A. Thompson<br>P.O. Box 916, Boulder, Colo. 80302 |
|---|---|---|
| [21] | Appl. No. | 7,539 |
| [22] | Filed | Feb. 2, 1970 |
| [45] | Patented | Sept. 28, 1971<br>Continuation-in-part of application Ser. No. 714,555, Mar. 20, 1968, now Patent No. 3,523,288. |

[54] BRUSH WEAR INDICATOR
10 Claims, 18 Drawing Figs.

[52] U.S. Cl. ..................................... 310/246,
310/247, 128/145.6, 318/478, 318/490
[51] Int. Cl. ....................................... H02k 13/00
[50] Field of Search ............................. 310/239,
242, 245, 246, 247, 248, 249, 151, 148, 229, 225;
340/52 A, 267; 318/478, 490; 128/145.6

[56] References Cited
UNITED STATES PATENTS

| 1,546,373 | 7/1925 | Farcus .................... | 310/248 |
| 2,090,926 | 8/1937 | Williamson .............. | 310/246 |
| 2,691,114 | 10/1954 | Lykins ..................... | 310/246 |
| 2,813,208 | 11/1957 | Ritter ...................... | 310/247 |
| 3,456,236 | 7/1969 | Labartino ................. | 340/52 A |
| 3,523,288 | 8/1970 | Thompson ............... | 340/267 |

Primary Examiner—Milton O. Hirshfield
Assistant Examiner—R. Skudy
Attorney—Van Valkenburgh and Lowe ABSTRACT: A brush wear indicator for an electric motor including a switch which is held in an open, or closed, state by a pin contacting and biased against a side of a motor brush. The switch trips to initiate a warning device whenever the brush is nearly worn out and lets the pin drop over an edge of the brush. A switch may be used with one or with each brush and when used with both, either switch will actuate the warning device. The warning device may be a light adapted to burn steadily or it may continually flash by including a flasher means in the warning device circuit.

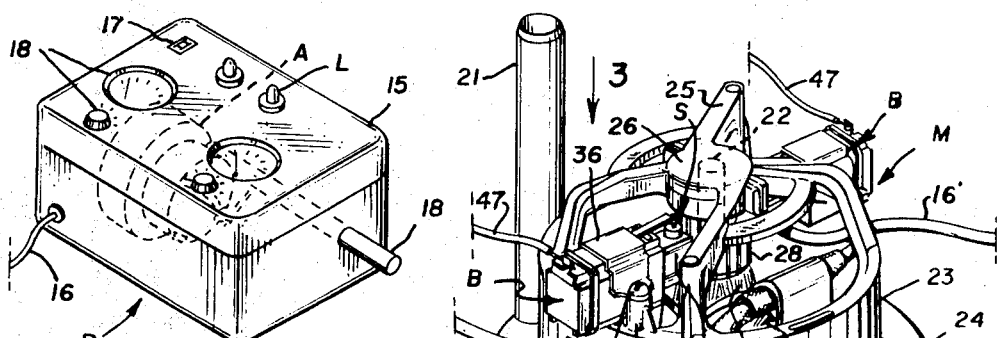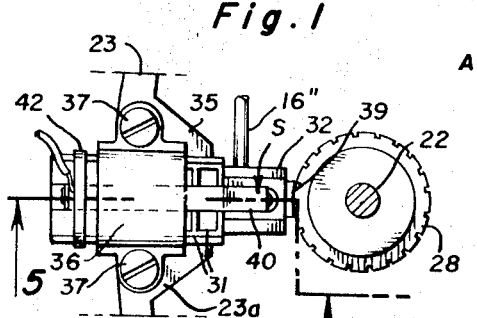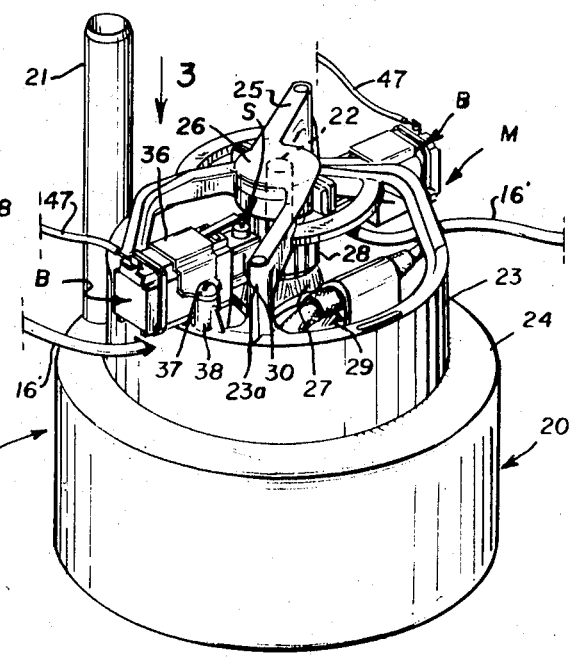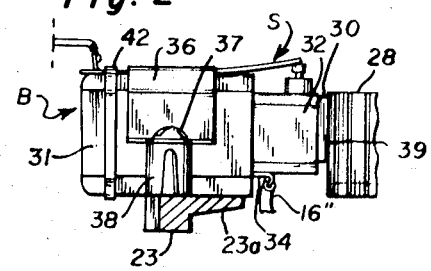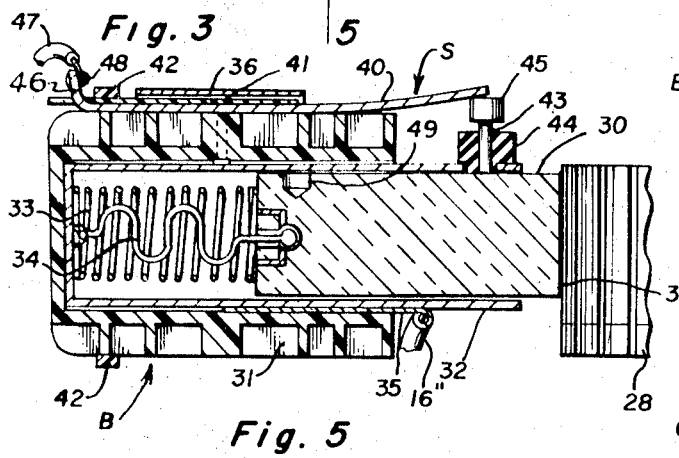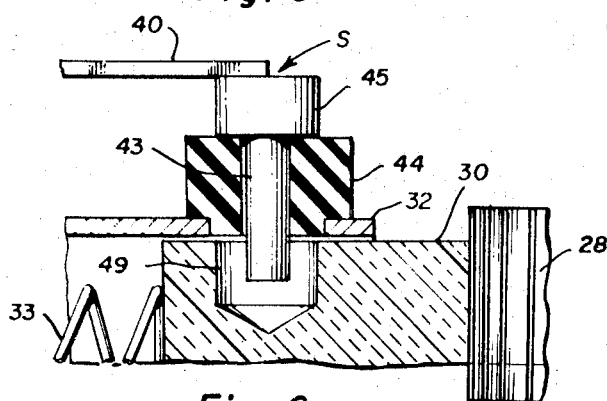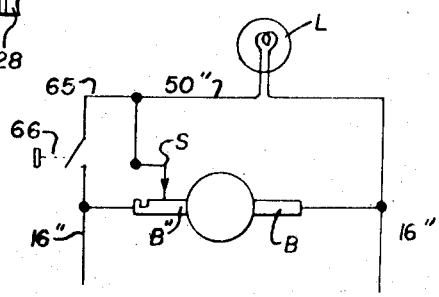

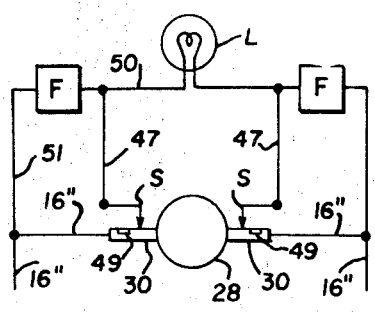
Fig. 7
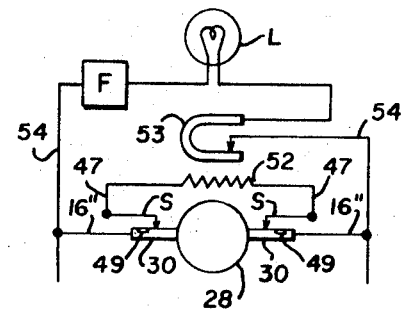
Fig. 8
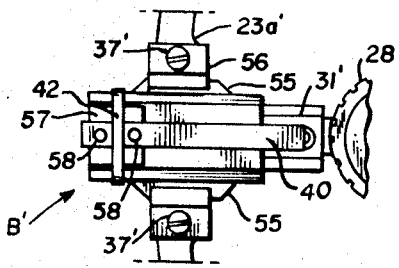
Fig. 9
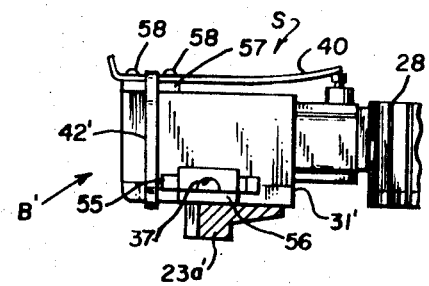
Fig. 10
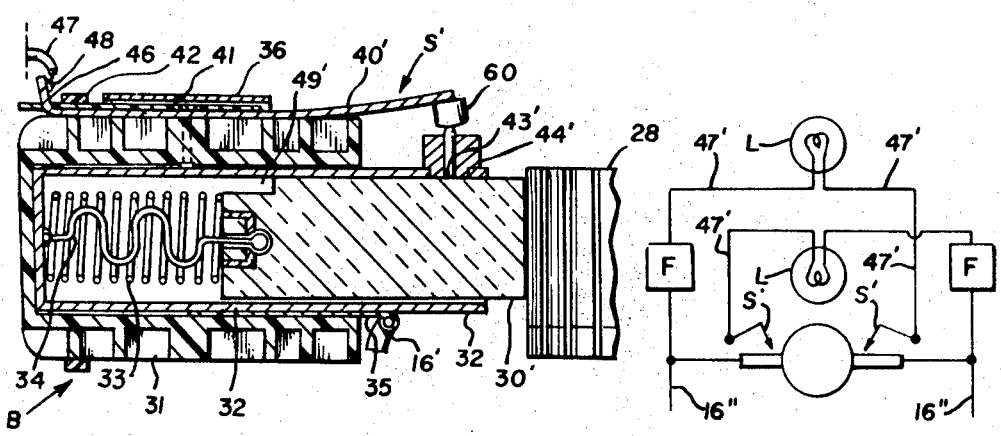
Fig. 11
Fig. 12

INVENTOR.
Harris A. Thompson
BY *Van Valkenburgh & Lowe*
ATTORNEYS

# 3,609,429

BRUSH WEAR INDICATOR

The present application is a continuation-in-part application of my prior application, Ser. No. 714,555 filed Mar. 20, 1968, now U.S. Pat. 3,523,288, for a Brush Wear Indicator, the present application claiming matter disclosed, but not claimed in the prior application and also disclosing additional subject matter pertinent to the invention.

This invention relates to wear-indicating devices, and more particularly to brush wear indicators in electric motors.

A primary object of the invention is to provide a novel and improved brush wear indicator for an electric motor which will actuate a suitable warning signal whenever the brush becomes sufficiently worn as to require replacement.

The present invention is especially useful in artificial respiration devices, especially those which must be run continuously to assist a patient in breathing. In such cases, should the apparatus be stopped because of a breakdown, the life of the patient may be in danger and every reasonable precaution must be taken to prevent such an occurrence. In such devices, the motor is usually a 12-volt-type, which is normally operated by an alternating current supplied by a regular 110-volt AC power source, with the voltage being reduced by a transformer. However, in case of an emergency, the motor may also be operated by a direct current power source such as a storage battery.

By keeping a storage battery available for emergency uses, a power supply is assured, and the only possibility of a breakdown will be in the mechanisms of the respirator itself. However, by the selection of good components, the respirator mechanisms can be designed to operate reliably over long periods of time, with the only wear occurring on the commutator brushes of the electrical motor driving the blower. Ordinarily, this brush wear can be predicted and after several thousand hours of operation, the motor will be inspected, serviced and the brushes replaced even though they may be only partially worn.

Naturally, such a procedure does not allow for contingencies such as an extraordinary rate of brush wear. Also, where a motor will run for several thousand hours without attention, the individuals relying upon the motor often lose track of time, with the result that the brushes will be worn out and the motor will stop, often at a very inconvenient time. Also, arcing will occur across a commutator before the motor stops to cause serious damage to the motor.

There is a real and definite need for an improved brush wear indicator in a situation such as that above indicated, where an electric motor must run continuously and where the brush wear is the component which requires the most frequent periodic attention. The above invention was conceived and developed with such a need in view, and comprises in essence, an auxiliary switch built into the brush assembly which is adapted to remain in a normally closed, or open, position until such time as the brush becomes worn. Thereupon, the switch trips to open or close to initiate a warning signal, preferably a flashing light, which will operate continuously thereafter until the motor brushes are replaced.

Accordingly, another object of the invention is to provide a novel and improved brush wear indicator for an electric motor which will include a warning device to warn users that the brushes are almost worn out and must be replaced before they are completely worn out.

Another object of the invention is to provide a novel and improved brush wear indicator which will emit a continual warning signal when the brush is about to be worn out, so that the brushes may be replaced at any time within several weeks after the warning signal commences as at a time when it is also convenient for a regular serviceman to check and service the motor and other mechanisms in the apparatus.

Another object of the invention is to provide a novel and improved brush wear indicator which is especially adapted to use an electrical flashing system, of the type where the flashing light will attract attention until the matter is taken care of.

Another object of the invention is to provide a novel and improved brush wear indicator which is especially adapted to be used in electrical motors of the type having unitized brushes and brush carriers for certain components of the indicator may be advantageously incorporated into the unitized brush carriers as a part of a factory-produced item.

Other objects of the invention are to provide a novel and improved brush wear indicator which is a simple, reliable, low-cost arrangement, and is easily incorporated into equipment such as respirator devices or also, into similar equipment where it is important to keep the electrical motors continuously running.

With the foregoing and other objects in view, my present invention comprises certain constructions, combinations and arrangements of parts and elements as hereinafter described, defined in the appended claims, and illustrated in preferred embodiment by the accompanying drawing in which:

FIG. 1 is an isometric view of a respirator, of a type which can advantageously use the invention, formed as an enclosed container, having controls and indicators on its upper face and blower within it as shown by broken lines.

FIG. 2 is an isometric view of a blower, such as is used in the respirator shown at FIG. 1, and showing the motor portion of the blower wherein the brush wear indicators are incorporated according to the present invention.

FIG. 3 is a plan view of a portion of the motor, as from the indicated arrow 3 at FIG. 2, but on an enlarged scale, to show the commutator and one brush within its holder bearing against the commutator.

FIG. 4 is a side elevational view of the portion of the motor shown at FIG. 3.

FIG. 5 is a longitudinal sectional view as taken from the indicated line 5—5 at FIG. 3, but on an enlarged scale.

FIG. 6 is a sectional fragment of the brush and its holder similar to a portion of the showing at FIG. 5, but on a greatly enlarged scale and with the brush being worn to the point where the improved brush wear indicator becomes operative.

FIG. 7 is a portion of the circuit diagram of the electric motor modified to include a circuit for a brush wear indicator, having a light which will burn steadily while the brushes are of an operative length, but which will flash when one or both of the brushes are nearly worn out.

FIG. 8 is a circuit diagram similar to FIG. 7, but with an arrangement having a light which will flash for a few minutes when the motor starts, but thereafter will not burn while the motor is running and the brushes are of an operative length, but which will flash when one or both of the brushes are nearly worn out.

FIG. 9 is a plan view similar to FIG. 3, but showing a modified type of brush holder.

FIG. 10 is a side elevational view of the construction shown at FIG. 9.

FIG. 11 is a longitudinal sectional view of the brush and its carrier similar to FIG. 5, but showing yet another arrangement wherein the electrical contact mechanism of the wear indicator is reversed from the arrangement shown at FIG. 5.

FIG. 12 is a circuit diagram similar to that of FIG. 7, but being modified to use the indicator shown in FIG. 11, using a separate light for each brush which will not burn while the motor is running and the brushes are of an operative length, but which will flash when the brush is nearly worn out.

FIG. 13 is yet another circuit diagram modified to provide a wear indicator at one brush only, to provide for a continuously burning pilot light which goes out when the brush is nearly worn out, and to provide for a manual switch to test the pilot light.

Figure 14:
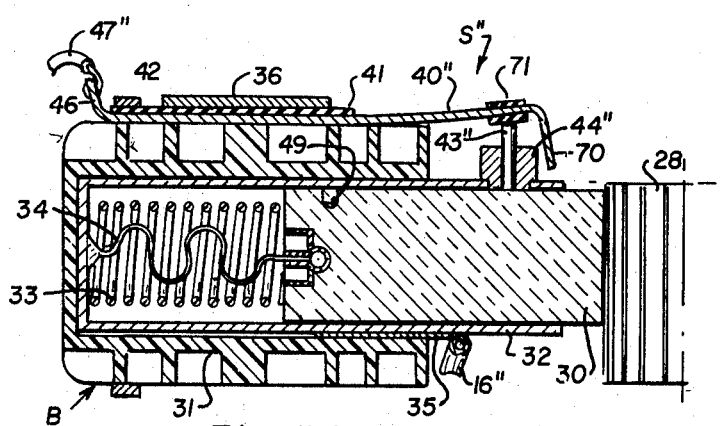
FIG. 14 is a longitudinal sectional view of a brush and its carrier similar to FIG. 11, showing another type of electrical contact mechanism which is normally held open.

Referring more particularly to the drawing, FIG. 1 illustrates a typical respirator R which is one example of an apparatus wherein the present invention may be incorporated. This respirator is formed as a boxlike case 15 having a power supply lead 16 extending into the case to drive various mechanisms therein, such mechanisms including a motorized air blower A and control components not shown. A switch 17 and suitable gages and control knobs 18 are located on the surface of the case 15 for turning the unit on and for adjustments during its operation. Also, a blower tube 19 extends from a side of the case for attachment to respiratory equipment, not shown.

In the present invention, a brush wear indicator is incorporated in the electrical motor of the blower A and it includes a signal means which will actuate whenever one, or both, of the brushes become worn to the point where replacement is required, all as will be hereinafter described in detail. Preferably, such a signal means is a light L which is conveniently mounted upon the respirator case 15 and which will light up, go out or continually flash whenever it is actuated depending upon the type of circuit used with the light. The purpose of the light, regardless of the manner in which it operates, is to call to the attention of the users, the need for brush replacement and a periodic check of the apparatus to prevent a breakdown at an inopportune time, and thereby assure a long period of continuous operation of the apparatus.

The air blower A, as illustrated at FIG. 2, includes a cylindrical shell 20 wherein a centrifugal blowing mechanism is housed, with a suitable discharge tube 21 extending from one side of the shell to connect with the blower tube 19. It includes also, an electrical motor M outstanding from an end of the shell and in axial alignment therewith. The motor shaft 22 shown in dotted lines at FIG. 2, extends into the shell 20 to carry the rotor of the blower.

The motor M is a conventional arrangement housed within a suitable cylindrical frame 23 fixed to the shell 20 as by a transition 24. This frame includes a spider 25 at its outward end to carry a bearing 26 for the end of the shaft 22. The shaft carries the rotor windings 27 and a commutator 28. The field windings 29 are mounted within the frame about the rotor and two diametrically opposed brush carriers B are mounted upon the edges of the frame 24 so that the brushes 30 within them bear against the commutator 28. Power leads 16' extend to this motor through the frame to connect with the field windings 27 and the brushes 30 to render the unit operative.

The present invention is concerned with indicating the wear of the brushes 30 as they bear against the commutator and the invention includes a normally closed, or normally open switch which will be opened, or closed, by the position of the brush within its carrier B just before the brush is worn out.

The carrier B must insulate the brush 30 from the motor frame and thus, the construction on various types of electric motors is quite similar. In the construction illustrated, the carrier is generally formed as a deep, cuplike body 31 of a plastic or similar insulating material. A short metallic tube 32, closed at one end, approximately one-third longer than the body and essentially rectangular in cross section, is mounted within the body to form a socket with the forward portion thereof extending beyond the body 31. The brush 30 slidably fits in this socket and a spring 33 also lies within this socket behind the brush and is adapted to urge the brush outwardly. A pliable feeder wire 34 is mounted in the tube within the embrace of this spring 33, and is secured to the bottom of the tube 32 and to the back of the brush 30. This wire 34 thus connects the brush with the tube to provide a better electrical contact between the two and also, limits the outward movement of the brush from the tube when it is worn out. To complete this assembly, a lead wire 16" is attached to the outer face of the metallic tube as by a clip 35, tightly fitting into a small space between the body 31 and tube 32 as best illustrated at FIG. 5.

This body 31 is mounted upon a shelf portion 23a on the rim of the motor body 23 by a clamp 36 extending over the body 31 and being held in position by mounting screws 37 turned into socketed studs 38 upstanding from the shelf 23a. So mounted, the axis of the body is radially oriented with respect to the commutator axis with the mouth of the socket formed by the tube 32 being comparatively close to the commutator 28. Accordingly, the major portion of the brush 30 will slidably extend into the tube 32 with its outward end 39 projecting therefrom to contact the commutator, as clearly illustrated at FIg. 5. It follows that as the brush is worn, the spring 33 urges it outwardly from the socket and against the commutator, and that when the brush is worn to the point where it is considered worn out, the retaining wire 34 is stretched taut preventing further movement of the brush. It must then be replaced or else the motor will soon stop running. Before it stops, however, the arcing from the brush to the commutator can damage the commutator.

To modify this brush carrier B and the brush 30 within it, to indicate when the brush is nearly worn out, an indicator switch S for each brush is mounted upon the respective carriers B. In the construction illustrated at FIGS. 2 through 6, the indicator switch S includes a resilient arm 40, of flat spring brass, or the like, which lies upon the top of the body 31 to extend longitudinally thereupon with the forward extended end being cantilevered over the portion of the tube 32 extending beyond the body 31. This arm 40 is held in position by the clamp 36, but with a flat insulator pad 41 between the arm 40 and clamp 36 to completely insulate the arm from the frame of the motor. A lock strap 42 may also be wrapped about the portion of the body 31 which extends outwardly from the frame ledge 23a, to extend also about the arm 40 and insulator pad 41 as shown.

The indicator switch S also includes a slide pin 43 carried in an insulator button 44 which fits with a press fit in an opening in the top surface of the extended end of the tube 32 directly underneath the cantilevered end of the arm 40. The button 44 has a central passageway through it wherein the body of the pin 43 slidably fits to extend through it and bear against the brush 30. The top of the pin includes an enlarged head 45 which is contacted by the undersurface of the arm 40. The length of the pin is such as to hold the arm 40 in a lifted position and biased against the pin when the bottom of the pin within the insulated bottom 44 is bearing against the top of the brush within the tube 32, as best illustrated at FIG. 5.

Accordingly, in the arrangement, a continuous electrical circuit extends through the normally closed switch S, extending from the brush 30, to and through the pin 43, and to and through the arm 40. The outward end of this arm, opposite the pin contact end, is upturned as at 46, to provide a connector clip for the attachment of a lead wire 47 as by a drop of solder 48. The lead 47 is part of a signal means circuit as hereinafter described.

The switch S, thus described, is normally closed and the signal means will be actuated when the switch is tripped to open and interrupt the circuit through it. Tripping may be effected by locating the insulator button and pin at a position on the tube 32 where the rear inner edge of the brush will pass as it approaches the wornout position so that the pin will drop away from the brush. However, because of the chance that the pin might accidentally contact the spring 33, it is preferred that the pin drop into a hole 49 drilled into the top of the brush 30 near its inner, rearward end as illustrated at FIg. 6. The hole 49 is several times as large as the pin and it is to be noted that when the pin is dropped into this hole 49, the undersurface of the head 45 abutting against the button 44 limits the depth to which the pin may drop so that it will not contact the bottom of the hole. It is also to be noted that the size of the hole 49 is such that some brush wear will occur before the pin moves from the edge of the hole, its position when it first drops into the hole, to the middle of the hole as illustrated. Thus, the circuit may be open to permit the signal means to operate for several weeks before the motor stops.

The location of the hole 49 is correlated with the length of the restraining wire 34 so that as brush wear causes the hole 49 to shift to the position shown at FIG. 6, or shortly therebeyond, the restraining wire will become taut to prevent further brush movement and to eventually stop the motor.

One or both brush carriers B may be provided with switches S, and various signal circuits may be used in connection therewith as will now be described.

Where two indicator switches S are used, a circuit such as that illustrated at FIG. 7 may be used. This circuit shows that portion of the motor circuit associated with the brushes. The two power leads 16 to the motor connect to the field coils and extend to the brushes 30 as lead 16″. Since each switch S is normally closed by contacting its brush, the opposing leads 47 form a shunt connecting with a lead 40 wherein the signal light L is mounted, between the leads 47. Thus, as long as both switches S are closed, the signal light will emit a steady, glowing light whenever the motor is running. The steady light will indicate that the apparatus is turned on and is functioning properly.

Each end of the lead 50 also connects with a lead 51 in parallel with the shunt lead 47 and the lead 51 connects to the power supply lead 16″ back of the brush 30. Each lead 51 includes a flasher generator F, of any suitable type such as, for example, a Tungsol unit, Type 616, manufactured by Tung Sol Electric Co. Accordingly, it follows that whenever either indicator switch S opens because the brush wear permits the pin 43 to drop into a hole 49, the flow through the shunts 47 and lead 50 is interrupted and the light L goes out. Then the current must flow through a lead 51 and this flow will actuate the flasher generator F and cause the light L to flash to indicate that it is necessary to replace a brush.

Another circuit, which may be used where it is desirable to have the light L burn only when flashing is desired, is illustrated at FIG. 8. The leads 47 from each switch S are connected to a resistor 52, the heating element of a thermal relay of the type which uses a bimetallic switch 53, which is normally closed and opens responsive to heat from resistor 52. One commercial unit having such components is an Amperite 5CT3 manufactured by Amperite Co., Inc. This switch 53 is in a circuit lead 54 which includes a flasher generator F and the signal light L in a series arrangement. The lead 54 is connected directly to the opposite power leads 16″ back of the brushes 30, so that whenever the switch 53 is closed, the flasher F causes the light L to flash. In operation, with the motor running and the indicator switches S properly contacting their respective brushes, the resistor 52 is heated to hold the switch 53 open. The switch 53 closes whenever a switch S opens as when a brush is worn out or when the motor is turned off. The light L will flash for a short period of time immediately after the motor starts and before the resistor 52 is heated, but such is not significant and actually is desirable since it serves as an indication that the flasher is operative.

FIGS. 9 and 10 illustrate a modified form of a brush carrier B′. In this construction, the plastic body 31′ has a pair of opposing legs 55 and it is held in position by clips 56 mounted on a flat shelf 23a′ of the motor body as by mounting screws 37′. The arm 40 is mounted upon a pad 57 and secured in place by pins 58 which extend through both the arm and pad. To supplement the pins, a lock strap 42 embraces the assembly about the pad as illustrated.

FIG. 11 illustrates one manner in which the arc indicator switch S′ may be mounted upon the brush carrier B to function as a normally open, rather than a normally closed, switch to be closed only when the brush is worn. In this construction, the components forming the brush carrier B, the body 31, the tube 32, spring 33, conductor wire 34 and circuit connecting clip 35 are the same as hereinbefore described. Likewise, certain components of the switch S′ and the components the same as hereinbefore described. An arm 40′ of a slightly modified construction, cantilevers from the body 31 to overlie the inward end of the tube 32 and be held in position upon the body by a U-strap 36 with an insulator pad 41 between the arm and strap 36. Likewise, a lock strap 42 may fasten the arm 40′ to the body 31 and the outer end 46 of the arm may be connected to a lead wire 47, as illustrated.

The button 44′ is not an insulator button, but a conductor button, of metal, and is soldered or otherwise fastened to the tube 32. The slide pin 43′, on the other hand, is a simple, cylindrical member formed of an insulating, nonconductor material. This pin does not carry a head, but instead, a suitable contact button 60 is affixed to the underside of the end of the arm 40′. The length of the pin 43′ is such that when it is within the passageway of the button 44′ and bears against the top of the brush, the contact button 60 on the arm is lifted above the conductor button 44′. however, when it drops into the socket 49′, the contact 60 rests upon the button 44′ making contact to close the circuit. It is to be noted that the socket 49′, as illustrated in FIG. 11, can be slot-formed instead of being a hole and also, it can be eliminated with the pin 43′ being adapted to drop over the rear edge of the brush since the insulated pin will not cause an undesirable circuit if it contacts a spring 33.

FIG. 12 is a circuit which may be used with the construction illustrated at FIG. 8. The lead 47′ from each switch S′ is connected to an individual light L, a flasher F and to the power input circuit 16″ at the opposite side of the motor. Therefore, whenever a normally open switch S′ is closed, the circuit is closed and the light L will commence to flash. It is to be noted that individual lights L and individual flashers F will be required to each circuit lead, however, special lights can be used having separate filaments.

FIG. 13 is a circuit which produces a burning light as long as the brushes are in good condition and which goes out to warn the user of the apparatus when the brushes are worn. Also, this figure shows a circuit which uses a switch S on only one brush B″. The use of the single switch S is desirable in an electric motor where the wear of of one brush is always faster than the wear of the other, a condition common in many types of motors. Accordingly, the switch S is located at the faster wearing brush B″, and the lead 47 therefrom, connects with a lead 50″ wherein the light L is located and this lead 50″ extends, thence, to the power circuit lead 16″ opposite the brush B″.

The circuit is closed and the light burns whenever the motor is operating and until the switch S opens because of brush wear. To ascertain whether or not the light goes out for this reason or is merely burnt out, a check circuit lead 65 having a normally open manual switch 66, shunts the switch S. Closing switch 66 will cause the light to turn on if brush wear is the cause of its going out.

FIG. 14 illustrates another construction of a brush contact mechanism, a wear indicator switch S″, which may be mounted upon a brush carrier B the same as heretofore described. This wear indicator switch S″ will function as a normally open switch which closes when the brush is almost worn out. The components forming the brush carrier B are as heretofore described and include a plastic body 31, a metal tube 32 within this body forming a brush socket, the brush 30 within this tube which is urged outwardly against the motor commutator 28 by a spring 33 and the feeder wire 34 which limits the outward movement of the brush. A circuit lead 16″ is affixed to the tube by a clip 35 the same as heretofore described. This body is mounted upon a motor and is held in position as by a clamp 36, the same as heretofore described.

The indicator switch S″, mounted upon this brush carrier, is formed as a resilient arm 40″ of flat spring brass, or the like, which is carried upon the top of the brush carrier, shielded with a flat insulator pad 41 and secured in position by a lock strap 42. This arm 40″ cantilevers from the body to overlie the end of the tube 32 which projects from the body to hold the brush adjacent to the commutator 28. The opposite end of the arm, at the lock strap, is formed as an upturned tab 46 whereto a lead wire 47″ is soldered as heretofore described.

In this modified wear indicator switch, the arm 40″ is downturned to form a finger 70 which is of sufficient length to make contact with the tube 32. A cylindrical button 44″ is affixed in the top of the tube 32 to carry a slide pin 43″ extending through an axial passageway in the button 44″ to rest upon the top surface of the brush 30 and normally to hold the finger 70 of the arm 40″ away from contact with the tube 32. There is provided at the top surface of the brush adjacent to the inner end, within the tube, a hole 49 wherein the pin will fall when the brush is nearly worn out, the same as heretofore described. In commercial production, it was found advantageous to manufacture the pin 43″ of metal rather than from an insulating material such as described at FIG. 11. Therefore, to prevent an electrical contact between the pin 43″ and the arm 40″ wherever the pin is holding the arm and finger 70 out of contact with the tube 32, an insulator tab 71 is formed about the spring adjacent to the finger and at the location where it is contacted by the pin. This tab is conveniently formed as a short length of plastic or rubber tubing fitted about the arm as illustrated.

Figure 15:
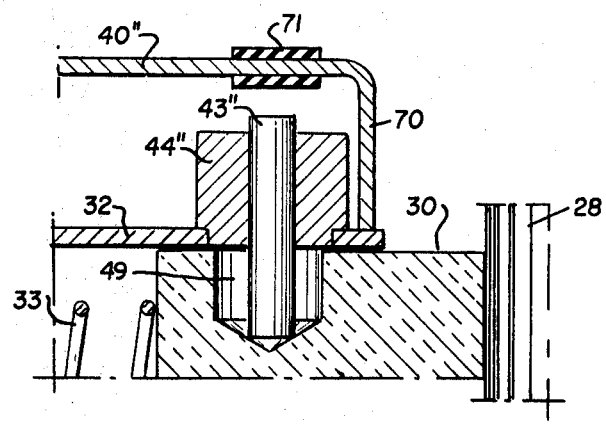
FIG. 15 is an enlarged sectional fragment of the brush and holder shown at FIG. 14, but with a worn brush and closed contacts.

The operation of this unit is manifest from FIGS. 14 and 15. Whenever the brush is not worn as illustrated at FIG. 14, the pin 43″ riding the brush 30 and bearing against the insulation tab 71 holds the arm away from electrical contact with the tube 32. However, whenever the brush is nearly worn out, the pin falls into the pocket 49 to permit the contact of the arm with the tube. The diameter of the pocket 49 is several times as great as that of the pin. Thus, the brush will continue to function to drive the motor in a normal manner for a suitable period of time, such as several weeks until its movement into the commutator 28 is either stopped by the wire 34 or by the pin 43″ abutting against the wall of the hole 49.

Figure 16:
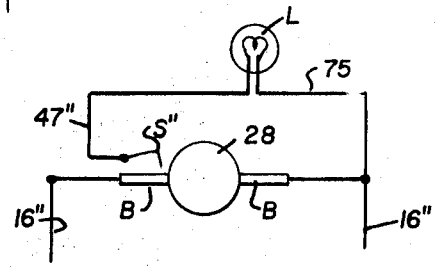
FIG. 16 is a portion of the circuit diagram of a shunt-wound electric motor including a brush wear indicator circuit using a normally open contact mechanism at one brush.
Figure 18:
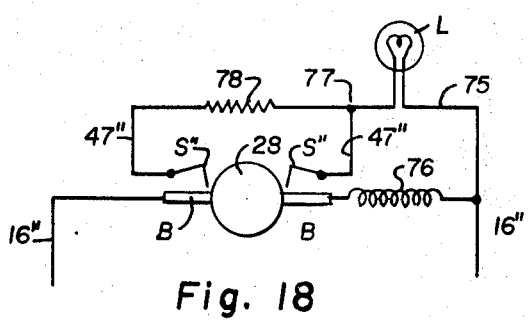
FIG. 18 is a circuit diagram similar to FIg. 17, but using a normally open contact mechanism at each brush.

An advantage of the constructions shown at FIGS. 11 and 16 resides in the simplicity of a warning circuit which may be associated with the motor circuit to light a warning light or a similar device. FIG. 16 shows a portion of a shunt-wound motor with the wear indicator switch S″ being at one of the brushes B. A lead 47″ from the arm 40″ extends from the switch S″ formed by that arm to a warning light L. Thence a lead 75 extends to the power source lead 16″ at the opposite side of the commutator 28. The warning lamp L may be a standard bulb or a flasher or any other suitable device which will warn the users of the apparatus that a brush is nearly worn out. Activation of this light will occur whenever the finger 70 contact the tube 32.

Figure 17:
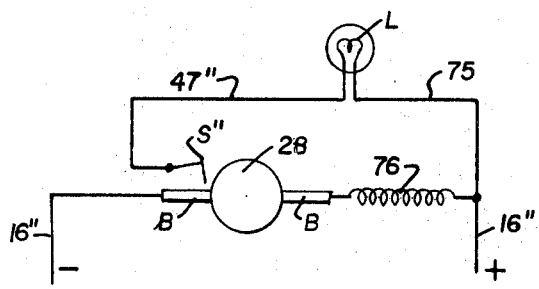
FIG. 17 is a circuit diagram of a series-wound electric motor modified to include a brush wear indicator circuit using one normally open contact mechanism at a brush.

FIG. 17 is a diagram of a series-wound motor, of a type which is especially adapted to direct current. In the use of direct current, the brush at the negative side of the commutator, opposite the field winding, will ordinarily wear faster than the brush at the positive pole. Thus, a single wear indicator switch is all that will be necessary. In the drawing the field coil 76 is at the positive lead 16″ and the wear indicator circuit switch S″ is at the brush of the negative lead 16″. The lead 47″ extends to a warning light L and thence to lead 75 extends to the power supply lead 16″, the apparatus functioning as heretofore described except that the voltage across the warning light L will be drop across both the commutator 28 and the field 76.

Where the series-wound motor is used with an alternating current, the wear of the brushes may be so nearly the same as to be difficult to determine which brush will wear out first and a brush wear indicator switch 3″ is needed at both of the brush holders B so that either switch may be closed to cause a warning light L to be lit. To adapt both switches S″ to activate the warning light L, the leads 47″ of each switch join as a common terminal 77 and extend thence to the light L. Thence, a lead 75 from the light L connects with a power source lead 16″ at the side of the field winding. The lead 47″ of the switch S″ connecting with the brush opposite the field winding includes a resistance 78 sufficient to provide a voltage drop comparable with the voltage drop across the commutator. However, this resistance may not be necessary if the warning lamp L, or its equivalent, is of a type which will activate regardless of whether the voltage drop is that across the field winding or that across the field winding plus that across the rotor.

This invention has been described for two-brush, single-phase motors. However, it could be easily applied to other types of electrical motors such as three-brush, three-phase units. Moreover, it is obvious that others skilled in the art can build and devise similar alternate and equivalent constructions which are nevertheless within the spirit and scope of my invention. Hence, I desire that my protection be limited, not by the constructions illustrated and described, but only by the proper scope of the appended claims.

1. A brush wear indicator system for an electric motor having a commutator and a brush slidably contained within a socketed carrier, with its leading edge extending therefrom to contact the commutator, said brush being resiliently biased to be moved from the carrier and against the commutator as it wears, and comprising in combination therewith:
   a circuit shunting the brush and a circuit component of the motor;
   a switch means in said circuit adapted to be tripped from a normal position and to thereby disrupt the circuit;
   a signal means actuated responsive to a disruption of the circuit;
   a holding pin mounted upon the carrier, biased towards the brush with one end bearing against a side of the brush when the brush is normally within the carrier socket and the other end holding said switch means in its normal position, said pin dropping behind a rearwardly disposed edge of the brush surface when the brush is moved toward the commutator and nearly worn out, and thereby tripping the switch means; and
   an insulation means, at the pin, to insulate the switch means from the brush.

2. In the organization set forth in claim 1, wherein the brush includes a hole in its side near its rearward end in alignment with the pin to constitute said rearwardly disposed edge so that the pin will drop into the hole.

3. In the organization set forth in claim 1, wherein:
   said switch means includes a resilient arm mounted upon the carrier having an end biased towards the socket therein;
   said pin is carried in a passageway extending through a hole in the wall of the carrier and into the socket with its inner end bearing against the side of the brush and its outward end holding the arm away from the carrier when the brush is in its normal position, but with said pin dropping over the edge of the brush and into the socket when the brush is moved close to its worn out position to thereby release the arm and permit it to move towards the carrier.

4. In the organization set forth in claim 3, wherein the pin is an insulator and said switch means includes an electrical contact on the carrier adjacent to the pin which is adapted to be contacted by the arm whenever the pin drops away from the brush.

5. In the organization set forth in claim 3, wherein said insulation means includes a pad at the arm at the location where the pin contacts the arm.

6. In the organization set forth in claim 5, wherein said pad is a short sleevelike member fitted about the arm.

7. In the organization set forth in claim 5, wherein said pad is a short, sleevelike member fitted about the arm, and a finger extending from the arm to contact the carrier to close the circuit thereof whenever the arm moves towards the carrier.

8. An artificial respiration apparatus including in combination:
   an electrical motor to operate the apparatus having a brush in a socketed carrier resiliently biased against the commutator of the motor;
   b. an indicator circuit including a switch means and a warning means adapted to actuate when the switch means is tripped from a normal position, said switch means including a spring member mounted upon the carrier and resiliently biased towards the brush within the carrier;

c. a passageway through the carrier wall between the switch spring member and the brush;
d. a switch-tripping means including a pin slidably carried in the passageway with its outer end contacting the aforesaid spring member and its inner end contacting a side of the brush when the brush is normally within the carrier, said pin being held against the brush by the spring member but dropping from an edge of the brush when the brush approaches its wornout condition, whereby to permit the spring member to move towards the brush; and
e. a means to actuate the switch means when the spring member moves toward the brush.

9. In the organization set forth in claim 8, wherein:
the spring member is a conductor;
the pin is an insulator member to hold the switch means normally open when inactuated; and
a contact means is mounted on the carrier adapted to contact the resilient means and close the switch when the pin drops away from the brush.

10. In the organization set forth in claim 8, wherein:
said switch means is normally open when inactuated;
said spring member is a conductor arm attached to the carrier and cantilevered from its point of attachment and the extended end of this arm includes a finger adapted to engage a conductor component at the brush; and
an insulation pad on the arm at the point of contact by the pin adapted to prevent an electrical contact between the arm and brush through the pin.